(12) United States Patent
Zhou et al.

(10) Patent No.: US 8,083,834 B2
(45) Date of Patent: Dec. 27, 2011

(54) HIGH PERMEABILITY MEMBRANE OPERATED AT ELEVATED TEMPERATURE FOR UPGRADING NATURAL GAS

(75) Inventors: Lubo Zhou, Des Plaines, IL (US); Chunqing Liu, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 335 days.

(21) Appl. No.: 12/116,255

(22) Filed: May 7, 2008

(65) Prior Publication Data
US 2009/0277327 A1    Nov. 12, 2009

(51) Int. Cl.
*B01D 53/22*    (2006.01)
(52) U.S. Cl. .................... 95/51; 96/4; 96/8; 96/9; 96/11; 96/13; 96/14
(58) Field of Classification Search ................ 95/45, 51; 96/4, 7, 8, 9, 10, 11, 13, 14; 210/640, 641, 210/500.27, 500.33, 500.39
See application file for complete search history.

(56) References Cited

U.S. PATENT DOCUMENTS

| | | | | |
|---|---|---|---|---|
| 4,130,403 A | * | 12/1978 | Cooley et al. | 95/51 |
| 4,597,777 A | * | 7/1986 | Graham | 95/51 |
| 4,659,343 A | * | 4/1987 | Kelly | 210/640 |
| 5,034,026 A | * | 7/1991 | Summers et al. | 95/51 |
| 6,632,266 B2 | * | 10/2003 | Thomas et al. | 95/51 |
| 7,132,008 B2 | * | 11/2006 | Wijmans et al. | 96/240 |
| 7,604,681 B2 | * | 10/2009 | Malsam et al. | 95/51 |
| 2004/0099138 A1 | * | 5/2004 | Karode et al. | 95/51 |

FOREIGN PATENT DOCUMENTS
GB    2 211 193 A   *  6/1989

OTHER PUBLICATIONS

Park, Ho Bum et al., "Polymers with Cavities Tuned for Fast Selective Trnasport of Small Molecules and Ions", Science, vol. 318, pp. 254-258, 2007.*
Tullos, Gordon L. et al., "Thermal Conversion of Hydroxy-Containing Imides to Benzoaxoles: Polymer and Model Compound Study", Macromolecules, vol. 32, pp. 3598-3612, 1999.*
Ho Bum Park et al., Science 318, 254 (2007).
Tullos et al., Macromolecules 1999, 32, 3598-3612.

* cited by examiner

*Primary Examiner* — Jason M Greene
(74) *Attorney, Agent, or Firm* — Mark Goldberg

(57) ABSTRACT

The present invention discloses a new process of treating natural gas using high gas permeability polybenzoxazole polymer membranes operated at high temperatures that can provide sufficient dew point margin for the product gas. The high gas permeability polybenzoxazole polymer membranes can be used for a single stage membrane system or for the first stage membrane in a two stage membrane system for natural gas upgrading. Simulation study has demonstrated that a costly membrane pretreatment system such as a Mem-Guard™ system will not be required in the present new process. The new process can achieve significant capital cost saving and reduce the existing membrane footprint greater than 50%.

9 Claims, No Drawings

HIGH PERMEABILITY MEMBRANE OPERATED AT ELEVATED TEMPERATURE FOR UPGRADING NATURAL GAS

BACKGROUND OF THE INVENTION

This present invention involves use of a high gas permeability polybenzoxazole membrane operated at high temperature for natural gas upgrading (e.g, $CO_2$ removal from natural gas). This membrane can be used in either a single stage membrane or as the first stage membrane in a two stage membrane system for natural gas upgrading. This invention allows the membrane to be operated without a costly pretreatment system.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams.

However, early field practice found that membrane performance can deteriorate quickly. The primary cause of loss of membrane performance is liquid condensation on the membrane surface. Condensation is prevented by providing a sufficient dew point margin for operation, based on the calculated dew point of the membrane product gas. UOP's MemGuard™ system, a pretreatment regenerable adsorbent system that uses molecular sieves, was developed to remove water as well as heavy hydrocarbons ranging from $C_{10}$ to $C_{35}$ from the natural gas stream, hence, to lower the dew point of the stream. The selective removal of heavy hydrocarbons by a pretreatment system can significantly improve the performance of the membranes.

Although these pretreatment systems can effectively remove heavy hydrocarbons from natural gas streams to lower their dew point, the cost is quite significant. Some projects showed that the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10-50% of the footprint of the whole membrane system. Removal of the pretreatment system from the membrane system has great economical impact especially to offshore projects.

The membranes most commonly used in commercial gas separation applications are polymeric and nonporous. Separation is based on a solution-diffusion mechanism. This mechanism involves molecular-scale interactions of the permeating gas with the membrane polymer. Polymers provide a range of properties including low cost, permeability, mechanical stability, and ease of processability that are important for gas separation. A polymer material with a high glass-transition temperature ($T_g$), high melting point, and high crystallinity is preferred.

Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. One issue of the CA membranes is the plasticization of CA polymer with high $CO_2$ concentration in the feed gas that leads to swelling and to an increase in the permeability and a decrease in the selectivity of CA membrane. High-performance polymers such as polyimides (PIs), poly(trimethylsilylpropyne) (PTMSP), and polytriazole were developed to combine high selectivity and high permeability together with high thermal stability. These polymeric membrane materials have shown promising properties for separation of gas pairs such as $CO_2/CH_4$, $O_2/N_2$, $H_2/CH_4$, and propylene/propane ($C_3H_6/C_3H_8$). However, commercially available polymer membranes can not be operated at elevated temperature because of low mechanical and thermal stability, low selectivity at high temperature.

A recent publication in Science reported on a new type of high permeability polybenzoxazole polymer membranes for gas separations (Ho Bum Park et al, Science 318, 254 (2007)). The polybenzoxazole polymers are prepared from high temperature heat treatment of hydroxyl-containing polyimide polymers containing pendent hydroxyl groups ortho to the heterocyclic imide nitrogen. These polybenzoxazole polymer membranes exhibited extremely high $CO_2$ permeability (>1000 Barrer) for $CO_2/CH_4$ separation. This material has very good mechanical and thermal stability at elevated temperature.

The present invention involves a process of treating natural gas using high gas permeability polybenzoxazole polymer membranes operated at high temperatures so that enough dew point margin will be provided for the product gas. Such membrane system can be operated without a pretreatment system, which can significantly save costs and reduce the footprint for the membrane system. This membrane can be used for a single stage membrane system or for the first stage membrane in a two stage membrane system for natural gas upgrading.

DETAILED DESCRIPTION OF THE INVENTION

The present invention involves a novel process of using high gas permeability polybenzoxazole membranes operated at high temperature to allow enough dew point margin for the membrane residue gas. The new process will eliminate the membrane pretreatment system such as UOP's MemGuard™ system.

Material Synthesis

The polybenzoxazole-type of membranes as reported in the literature (see Ho Bum Park et al, Science, 318, 254 (2007)) and used in the present invention can be prepared from thermal conversion of any hydroxy-containing polyimides with pendent hydroxyl groups ortho to the heterocyclic imide nitrogen upon heating between 350° and 500° C. under nitrogen or vacuum. The thermal conversion is accompanied by loss of carbon dioxide and no other volatile byproducts are generated. The hydroxy-containing polyimide polymers that are used for the preparation of high permeability polybenzoxazole-type of membranes in the present invention comprise a plurality of first repeating units of a formula (I), wherein said formula (I) is:

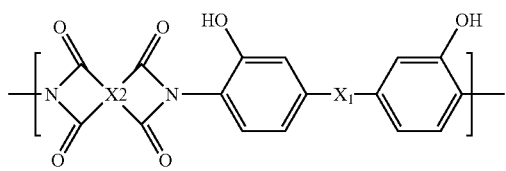

(I)

Where $X_1$ of said formula (I) is a moiety of:

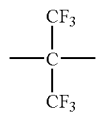

in which $X_2$ of said formula (I) is a moiety having a composition selected from the group consisting of a formula (A), a formula (B), a formula (C), and mixtures thereof, wherein said formula (A), said formula (B), and said formula (C) are:

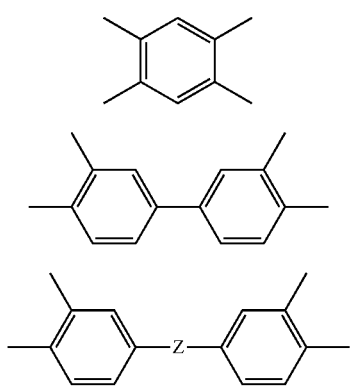

Z of formula (C) is a moiety having a composition selected from the group consisting of a formula (D), a formula (E), a formula (F), a formula (G), and mixtures thereof, wherein said formula (D), said formula (E), said formula (F), and said formula (G) are:

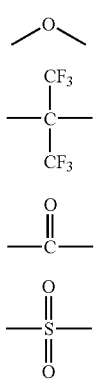

The polybenzoxazole-type of membranes used in the present invention can be fabricated into any convenient form such as sheets, tubes or hollow fibers. These membranes can also be fabricated into thin film composite membranes incorporating a selective thin polybenzoxazole layer and a porous supporting layer comprising a different polymer material or an inorganic material. This type of material provides a wide range of properties important for membrane gas separations such as easy processability, high permeability, and high chemical, mechanical and thermal stability.

Two polybenzoxazole membranes were prepared from a hydroxyl-containing polyimide (poly [2,2'-bis-(3,4-dicarboxyphenyl) hexafluoropropane dianhydride-2,2-bis(3-amino-4-hydroxyphenyl)-hexafluoropropane], 6FDA-APAF) membrane via high temperature heat treatment at 400° C. and 450° C., respectively, according to the literature procedure (see Ho Bum Park et al, SCIENCE, 318, 254 (2007)). The 6FDA-APAF polyimide polymer was synthesized from solution condensation of 2,2-bis(3-amino-4-hydroxyphenyl)-hexafluoropropane diamine monomer (Bis-APAF) and 2,2'-bis-(3,4-dicarboxyphenyl)hexafluoropropane dianhydride monomer (6FDA) according to the literature procedure (see Tullos et al, Macromolecules, 32, 3598 (1999)).

The precursor 6FDA-APAF polyimide membrane and the two polybenzoxazole membranes converted from 6FDA-APAF at 400° C. and 450° C. in $N_2$ for 1 h were tested for $CO_2/CH_4$ separation under different testing temperature and pressure (Table 1). It can be seen from Table 1 that the 6FDA-APAF polyimide membrane has $CO_2$ permeability and $CO_2/CH_4$ selectivity similar to traditional polyimide membranes. The polybenzoxazole membrane prepared from 400° C. thermal treatment (polybenzoxazole-400° C.) of the 6FDA-APAF polyimide membrane showed high $CO_2$ permeability ($P_{CO2}$=226.8 Barrer at 100° C. testing temperature) and good $CO_2/CH_4$ selectivity (16.7 at 100° C. testing temperature). The polybenzoxazole membrane prepared from 450° C. thermal treatment (polybenzoxazole-450° C.) of the 6FDA-APAF polyimide membrane showed much higher $CO_2$ permeability ($P_{CO2}$=1096.1 Barrer at 100° C. testing temperature) than polybenzoxazole-400° C. membrane.

TABLE 1

Pure Gas Permeation Test Results of 6FDA-APAF, polybenzoxazole-400° C., and polybenzoxazole-450° C. Membranes for $CO_2/CH_4$ Separation*

| Membrane | $P_{CO2}$ (Barrer) | $P_{CH4}$ (Barrer) | $\alpha_{CO2/CH4}$ |
|---|---|---|---|
| 6FDA-APAF | 34.6 | 2.41 | 14.4 |
| polybenzoxazole-400° C. | 226.8 | 13.6 | 16.7 |
| polybenzoxazole-450° C. | 1096.1 | 100.7 | 10.9 |

*$P_{CO2}$ and $P_{CH4}$ were tested at 100° C. and 690 kPa (100 psig); 1 Barrer = $10^{-10}$ cm$^3$ (STP) · cm/cm$^2$ · sec · cmHg.

EXAMPLES

Four examples were studied and compared to illustrate the advantage using the high gas permeability polybenzoxazole membranes operated at high temperature. Example 1 was a single stage system using the currently commercially available membranes. In this Example, a MemGuard™ pretreatment system was required to lower the dew point of the gas stream. Example 2 was a single stage system using the high gas permeability polybenzoxazole membranes used in the present invention operated at high temperature. Since sufficient dew point margin was provided by operating at the high temperature, no pretreatment system was required. In order to improve the recovery of hydrocarbons from the natural gas stream, a two-stage membrane system was studied. In Example 3, commercially available membranes were used for both first and second stage. A pretreatment system would be needed for Example 3. In Example 4, high gas permeability polybenzoxazole membranes are used for the first membrane stage. The second stage can use the same high gas permeability polybenzoxazole membranes or can use commercially available membranes such as polyimide or cellulose acetate. Since the first stage was operated at elevated temeprature to provide the sufficient dew point margin for the product gas, no pretreatment system was required for Example 4.

It is preferred that the membrane used as the second stage membrane in the two-stage membrane process of the present invention is fabricated from a rigid, glassy polymer with a high glass transition temperature (Tg). Glassy polymers (i.e., polymers below their Tg) have stiffer polymer backbones and therefore allow smaller molecules such as hydrogen and carbon dioxide to permeate the membrane quicker than larger molecules such as hydrocarbons. It is preferred that the membrane used as the second stage membrane in the novel two stage membrane process of the present invention exhibits a carbon dioxide over methane selectivity of at least 10, more preferably at least 15 at 50° C. under 690 kPa (100 psig) pure carbon dioxide or methane pressure.

Examples 1 and 2 assumed a natural gas feed with 8% $CO_2$, and the product spec for $CO_2$ at 2%. In Example 1, the commercial available membrane was assumed to be a membrane with typical performance in the current natural gas upgrading market. In Example 2, the polybenzoxazole-400° C. (based on the material in TABLE 1 converted at 400° C.) material was assumed to make the membranes with a thickness of 200 nm. The permeance of the new membrane was assumed at 0.031 $m^3(STP)/m^2 \cdot h \cdot kPa$ based on the permeability measured for the dense film, and the selectivity was assumed at 13, which is lower than the selectivity of a dense film. A process simulation based on the above performance was performed for Examples 1 and 2. The results are shown in Table 2.

TABLE 2

Simulation Results for Examples 1 and 2

|  | Example 1 | Example 2 |
| --- | --- | --- |
| Feed Flow, $m^3(STP)/h$ | $5.9 \times 10^5$ | $5.9 \times 10^5$ |
| $CO_2$ in Feed, % | 8 | 8 |
| $CO_2$ in Product Required, % | 2 | 2 |
| Pretreatment required? | Yes | No |
| Membrane Feed Temperature ° C. | 43.3 | 100 |
| Membrane Feed Pressure, KPa | 3792.3 | 3792.3 |
| Membrane area saved, % | — | 78.6 |
| Total Hydrocarbon Recovery, % | Base | −3 |

Comparing Example 1 to Example 2, Example 2 showed significant cost saving. It not only can save the cost and footprint of a pretreatment system, but also can save the cost for membrane system itself. Due to the high permeance of the polybenzoxazole membrane in Example 2, the required membrane area is only 21.4% as that in Example 1. The hydrocarbon recovery is slightly lower (3% lower) in Example 2 than in Example 1 due to lower $CO_2/CH_4$ selectivity of the polybenzoxazole membrane assumed. The Example 2 is extremely attractive if the hydrocarbon recovery is not important for the customers. For example, in some cases, the permeate gas will be used as fuel gas.

The hydrocarbon recovery can be increased by running a two stage membrane system as shown in Example 3 and Example 4. In Example 3, both stages applied the commercially available membranes with the performance data the same as in Example 1. In Example 4, the polybenzoxazole membranes were used for first stage in order to be operated at high temperature. The preferred second stage would be the membranes with high selectivity. Here, the commercially available membranes with the same performance as in Example 1 were applied for the second stage in Example 4. The natural gas feed in both Example 3 and Example 4 had been changed to 45% $CO_2$ (more meaningful for a two stage system), and the product specification for $CO_2$ in these two examples were assumed at 8%. Table 3 shows the results of the simulation for Example 3 and Example 4.

TABLE 3

Simulation Results for Example 3 and Example 4

|  | Example 1 | Example 2 |
| --- | --- | --- |
| Feed Flow, $m^3(STP)/h$ | $5.9 \times 10^5$ | $5.9 \times 10^5$ |
| $CO_2$ in Feed, % | 45 | 45 |
| $CO_2$ in Product Required, % | 2 | 2 |
| Pretreatment required? | Yes | No |
| $1^{st}$ Stage Membrane Feed Temperature, ° C. | 43.3 | 100 |
| $1^{st}$ Stage Membrane Feed Pressure, KPa | 3792.3 | 3792.3 |
| $2^{nd}$ Stage Membrane Feed Temperature, ° C. | 37.8 | 37.8 |
| 2nd Stage Membrane Feed Pressure, KPa | 3902.6 | 3916.4 |
| $1^{st}$ Stage Membrane area | Base | 26.5% |
| $2^{nd}$ Stage Membrane area | Base | Base |
| Total Compressor Horse Power | Base | 127.7% |
| Total Hydrocarbon Recovery, % | 95.3 | 95.3 |

It can be seen from the above table that Example 3 and Example 4 have identical hydrocarbon recovery. Due to the high temperature operation, Example 4 does not require a pretreatment such as a MemGuard™ system, which is about 10-40% of the total cost of Example 3. At the same time, the first stage membrane area is reduced 73.5% from Example 3 to Example 4. It can be expected that the Example 4 will have a big capital (>50%) and footprint (>50%) saving compared to Example 3. The only drawback is that the compressor will be bigger. Table 3 shows a 28% horse power increase from Example 3 to Example 4. This increase can be improved if the selectivity of the first stage membrane can be increased. The polybenzoxazole membranes' performance can be optimized in the future to achieve higher $CO_2/CH_4$ selectivity.

In conclusion, the new process proposed in this invention that uses high gas permeability polybenzoxazole membranes can be operated at high temperature to provide the sufficient dew point margin for product gas. Hence, a costly membrane pretreatment system such as a MemGuard™ system will not be required in the new process. The new membrane can be applied either for a single stage system, or for the first stage of a two stage membrane system. Due to the elimination of the pretreatment system and the significant reduction of membrane area, the new process can achieve significant capital cost saving and reduce the existing membrane footprint greater than 50%.

The invention claimed is:

1. A process for purifying natural gas comprising the steps of:
   contacting a mixture of unpretreated gases with a polybenzoxazole membrane at a first temperature between 100° C. and 200° C. to produce a permeate gas stream comprising a higher concentration of carbon dioxide than said mixture of unpretreated gases and a product gas stream comprising a lower concentration of carbon dioxide than said unpretreated gases; and
   contacting the permeate gas stream with a second stage membrane at a second temperature that is lower than the first temperature to produce a carbon dioxide permeate stream and a second product stream, wherein the second temperature is less than about 50° C.

2. The process of claim 1 comprising heating said mixture of unpretreated gases prior to contact with said polybenzoxazole membrane.

3. The process of claim 1 wherein said polybenzoxazole membrane is prepared from thermal conversion of a hydroxy-containing polyimide having a heterocyclic imide nitrogen wherein said polyimide has pendent hydroxyl groups ortho to the heterocyclic imide nitrogen, upon heating between 350° and 500° C. under nitrogen or vacuum.

4. The process of claim 3 wherein said hydroxy-containing polyimide comprises a plurality of first repeating units of a formula (I), wherein said formula (I) is:

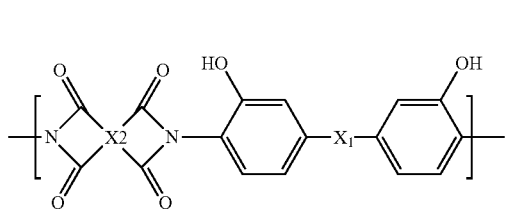

(I)

wherein $X_1$ of said formula (I) is a moiety of:

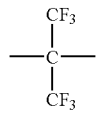

wherein $X_2$ of said formula (I) is a moiety having a composition selected from the group consisting of a formula (A), a formula (B), a formula (C), and mixtures thereof, wherein said formula (A), said formula (B), and said formula (C) comprise:

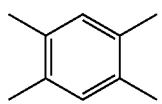

(A)

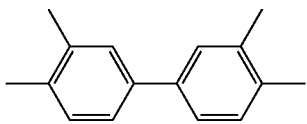

(B)

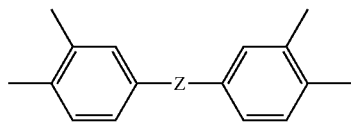

(C)

wherein Z of formula (C) is a moiety having a composition selected from the group consisting of a formula (D), a formula (E), a formula (F), a formula (G), and mixtures thereof, wherein said formula (D), said formula (E), said formula (F), and said formula (G) comprise:

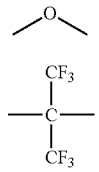

(D)

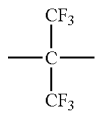

(E)

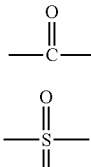

(F)

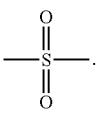

(G)

5. The process of claim 4 wherein said hydroxyl-containing polyimide is formed by polycondensation of 2,2-bis(3-amino-4-hydroxyphenyl)-hexafluoropropane diamine and a dianhydride selected from the group consisting of 2,2'-bis-(3,4-dicarboxyphenyl) hexafluoropropane dianhydride, 4,4'-oxydiphthalic anhydride, and mixture thereof.

6. The process of claim 1 wherein said polybenzoxazole membrane is in a form selected from the group consisting of sheets, tubes, hollow fibers, and thin film composites.

7. The process of claim 1 wherein said second stage membrane comprises a rigid, glassy polymer with a high glass transition temperature.

8. The process of claim 1 wherein said second stage membrane comprises a material selected from the group consisting of polybenzoxazole, polyimide and cellulose acetate.

9. The process of claim 1 wherein said second stage membrane exhibits a carbon dioxide over methane selectivity of at least 10, at 50° C. under 690 kPa (100 psig) pure carbon dioxide or methane pressure.

* * * * *